(12) United States Patent
Swales et al.

(10) Patent No.: US 9,181,993 B1
(45) Date of Patent: Nov. 10, 2015

(54) SELECTABLE ONE-WAY CLUTCH

(71) Applicant: GM Global Technology Operations LLC, Detroit, MI (US)

(72) Inventors: Shawn H. Swales, Canton, MI (US); Anthony J. Corsetti, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/447,084

(22) Filed: Jul. 30, 2014

(51) Int. Cl.
*F16D 41/16* (2006.01)
*F16D 41/12* (2006.01)

(52) U.S. Cl.
CPC ............... *F16D 41/12* (2013.01); *F16D 41/16* (2013.01); *F16D 2250/0084* (2013.01)

(58) Field of Classification Search
CPC .................................. F16D 41/14; F16D 41/16
USPC ........................................................ 192/43.1
See application file for complete search history.

(56) References Cited

U.S. PATENT DOCUMENTS

| | | | |
|---|---|---|---|
| 8,042,669 B2 * | 10/2011 | Samie et al. ................. | 192/43.1 |
| 8,042,670 B2 | 10/2011 | Bartos et al. | |
| 2008/0217131 A1 * | 9/2008 | Wittkopp et al. ............ | 192/43.1 |

* cited by examiner

*Primary Examiner* — Richard Lorence
(74) *Attorney, Agent, or Firm* — Harness, Dickey & Pierce, P.L.C.

(57) ABSTRACT

A selectable one-way clutch includes an inner member having a plurality of clutch teeth on an outer perimeter thereof. An outer clutch assembly includes at least one side plate supporting a plurality of pivoting pawls engageable with the clutch teeth of the inner member and an actuator operable to engage the plurality of pivoting pawls to selectively allow and or prevent the plurality of pivoting pawls from engaging the inner member. The at least one side plate includes an opening therethrough with a plurality of inner peripheral notches corresponding to the plurality of clutch teeth that allow the inner member to be received through the opening in the at least one side plate during assembly.

4 Claims, 2 Drawing Sheets

SELECTABLE ONE-WAY CLUTCH

FIELD

The present disclosure relates to a selectable one-way clutch and more particularly to a selectable one-way clutch with improved assembly.

BACKGROUND

This section provides background information related to the present disclosure which is not necessarily prior art.

Many of today's power transmissions, especially multi-speed automatic shifting power transmissions, have one or more one-way clutches. One-way clutches have one direction of operation for performing a torque-transmitting function and in the other direction of operation permits free rotation between the two members, which are connected with the one-way clutch device. The one-way clutch can include inner and outer races, one of the races, generally the outer race is held stationary by a portion of the transmission housing. The other race of the torque-transmitting one-way clutch is connected with a gear element within the transmission.

When the gear element attempts to rotate in one direction, the one-way clutch will lock-up between the gear member and the transmission housing thereby holding the gear member stationary such that a ratio is established within the transmission. When the gear member is driven or rotated in the opposite direction, the one-way clutch permits free rotation between the inner and outer races such that the gear connected therewith is free to rotate relative to the meshing members.

There have been a number of proposals for one-way clutches wherein an actuator mechanism is provided to cause the one-way clutch to be energized in one direction of operation during a portion of the torque-transmitting function and upon actuation of the control mechanism or actuator, the one-way device is operable to be able to transmit torque in the opposite direction of rotation so as to provide a selectable one-way clutch.

SUMMARY

This section provides a general summary of the disclosure, and is not a comprehensive disclosure of its full scope or all of its features.

A selectable one-way clutch includes an inner member having a plurality of clutch teeth on an outer perimeter thereof. An outer clutch assembly includes at least one side plate supporting a plurality of pivoting pawls engageable with the clutch teeth of the inner member and at least one actuator operable to engage the plurality of pivoting pawls to selectively allow and or prevent the plurality of pivoting pawls from engaging the inner member. The at least one side plate includes an opening therethrough with a plurality of inner peripheral notches corresponding to the plurality of clutch teeth that allow the inner member to be received through the opening in the at least one side plate during assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
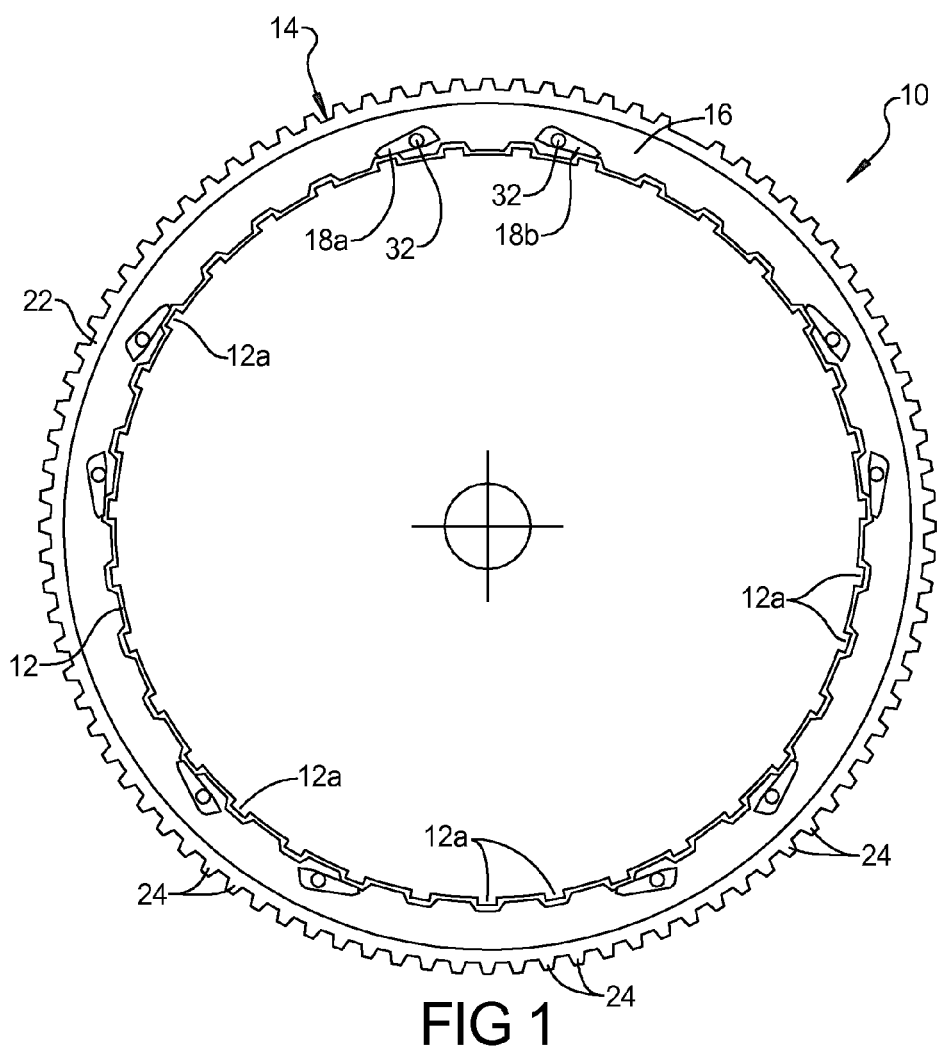
FIG. 1 is a side plan view of a selectable one-way clutch according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a selectable one-way clutch 10 according to the principles of the present disclosure will now be described. The selectable one-way clutch 10 includes an inner member 12 that is generally designed to be engaged with and rotatable with a transmission member (not shown). The inner member 12 includes a plurality of clutch teeth 12a on an outer perimeter surface thereof. The selectable one-way clutch 10 further includes an outer clutch assembly 14 that includes at least one side plate 16 that supports a plurality of pivoting pawls 18a, 18b. A first set of the plurality of pivoting pawls 18a are oriented in a first direction while a second set of the plurality of pivoting pawls 18b are oriented in a second opposite direction. The first set of pivoting pawls 18a can be activated to engage the teeth 12a and prevent clockwise relative rotation of the inner member 12 as viewed in FIG. 1. The second set of pivoting pawls 18b can be activated to engage the teeth 12a and prevent counter-clockwise relative rotation of the inner member 12, as viewed in FIG. 1.

Figure 2:
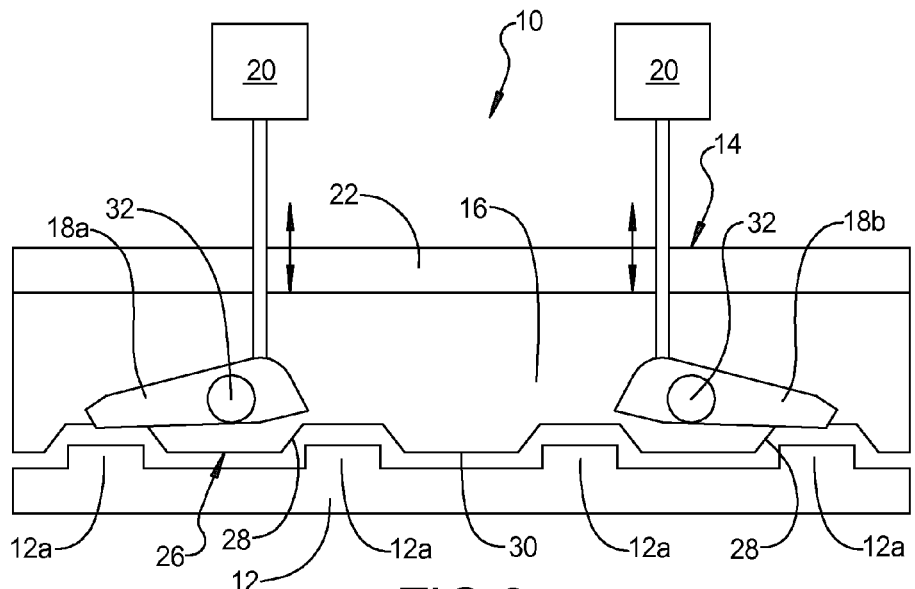
FIG. 2 is a schematic view of the inner member and outer clutch assembly with the side plate of the outer clutch assembly having notches therein to receive the teeth of the inner member during assembly.
Figure 3:
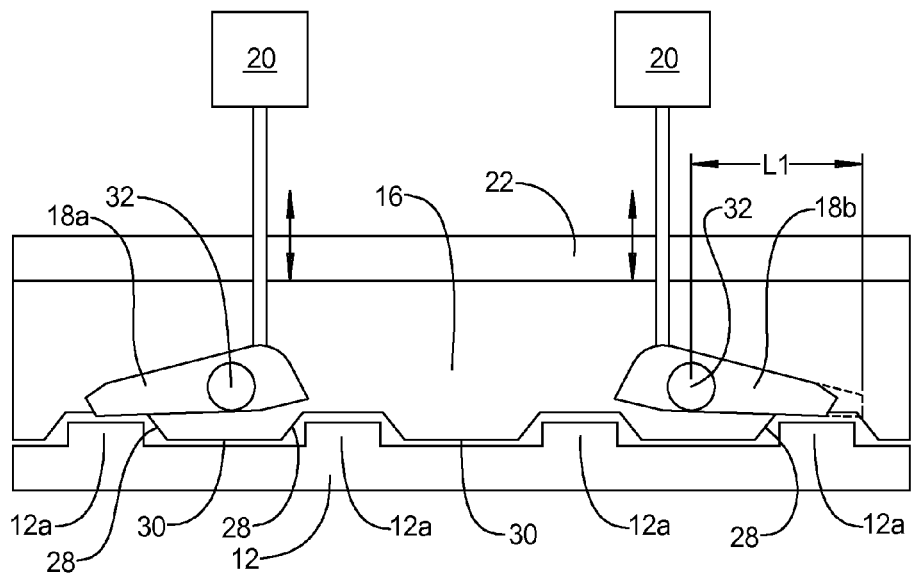
FIG. 3 is a schematic view of the inner member and outer clutch assembly with the pawls having different lengths from tip to pivots to accommodate irregular tip spacing.

As shown in FIGS. 2 and 3, one or more actuators 20 can be operable to engage the plurality of pivoting pawls 18a, 18b to selectively allow and/or prevent the first and second sets of pivoting pawls 18a, 18b from engaging the teeth 12a of the inner member 12. The at least one side plate 16 is non-rotatably attached to an outer ring 22 that can include a plurality of splines 24 (FIG. 1) that engage with mating splines (not shown) on an interior surface of a transmission housing (not shown) in order to hold the outer ring 22 and the at least one side plate 16 stationary relative to the transmission housing.

With reference to FIG. 2, the at least one side plate 16 is provided with an opening 26 defining an inner periphery having a plurality of notches 28 that correspond with the clutch teeth 12a of the inner member 12. The plurality of notches 28 allow the inner member 12 to be inserted through the opening 26 while maintaining thicker regions 30 of the side plate 16 that coincide with the pivots 32 for each of the pawls 18. The pawls 18a, 18b can be actuated by a variety of different types of actuators such as but not limited to, a cam, sleeve, solenoid, hydraulic pistons, etc.

The actuator(s) 20 can engage the pivot pawls 18a, 18b to hold the pivot pawls 18a, 18b in a disengaged position so that the inner member 12 rotates freely relative to the pivot pawls 18a, 18b. By manipulating the actuator(s) 20 the first set of pivoting pawls 18a can be selectively activated to engage the teeth 12a and prevent clockwise relative rotation (as viewed in FIG. 1) of the inner member 12 and the second set of pivoting pawls 18b can be selectively activated to engage the teeth 12a and prevent counter-clockwise relative rotation (as viewed in FIG. 1) of the inner member 12.

For assembly reasons, it is desirable to be able to insert the outer clutch assembly 14 over the inner member 12. The notches 28 in the side plate 16 allow the side plates to clear the inner member teeth 12a to facilitate a compact arrangement while still allowing adequate support for the pivot pins 32 of the pivot pawls 18 without increasing the overall radial cross-section of the overrunning clutch 10.

With reference to FIG. 3, the pawl tip-to-pivot length (L1) can be varied to accommodate irregular pawl spacing to provide sequential pawl engagement while maintaining the notches 28 in proper alignment with the teeth 12a of the inner member 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A selectable one-way clutch, comprising:
   an inner member having a plurality of clutch teeth on an outer perimeter thereof;
   an outer clutch assembly including at least one side plate supporting a plurality of pivoting pawls engageable with the clutch teeth of the inner member and an actuator operable to engage the plurality of pivoting pawls to selectively allow and or prevent the plurality of pivoting pawls from engaging the inner member, the at least one side plate having an opening therethrough with a plurality of inner peripheral notches corresponding to the plurality of clutch teeth that allow the inner member to be received through the opening in the at least one side plate during assembly.

2. The selectable one-way clutch according to claim 1, wherein said inner member has an outermost diameter that is larger than an innermost diameter of said at least one side plate.

3. The selectable one-way clutch according to claim 1, wherein said pivoting pawls are located on a pivot pin disposed between adjacent ones of the notches.

4. The selectable one-way clutch according to claim 1, wherein at least two of said plurality of pivoting pawls include different tip to pivot lengths.

* * * * *